(12) United States Patent
Kulkarni et al.

(10) Patent No.: US 12,231,546 B2
(45) Date of Patent: Feb. 18, 2025

(54) ENCRYPTION OF DATABASE LOG FILES

(71) Applicant: International Business Machines Corporation, Armonk, NY (US)

(72) Inventors: Vaibhav Murlidhar Kulkarni, Bangalore (IN); Sweta Singh, Bangalore (IN); Mario Briggs, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 17/445,744

(22) Filed: Aug. 24, 2021

(65) Prior Publication Data
US 2023/0067054 A1 Mar. 2, 2023

(51) Int. Cl.
*H04L 9/08* (2006.01)

(52) U.S. Cl.
CPC ............ *H04L 9/0841* (2013.01); *H04L 9/088* (2013.01)

(58) Field of Classification Search
CPC .. H04N 5/765; H04N 21/4221; H04N 5/4403; H04N 21/4126; H04N 21/42228; H04N 21/43615; H04N 21/44227; H04N 21/485; H04L 65/4076; H04L 65/608; H04L 65/80; H04L 45/00; H04L 29/06; H04L 29/06027; H04L 45/16; H04L 63/123; H04L 67/06; H04L 9/0841; H04L 9/088; G06F 13/28; G06F 3/0685; G06F 3/0626; G06F 3/0658; G06F 3/0688; G06F 11/1076; G06F 12/0246; G06F 13/16; H04W 4/06; H04W 72/005; H04W 28/06; H04W 48/10; H04W 48/12; H04W 4/08; H04W 12/06; H04W 12/12
USPC ........ 713/171, 150, 163, 181; 726/2, 21, 36; 380/255, 264, 276
See application file for complete search history.

(56) References Cited

U.S. PATENT DOCUMENTS

| | | | | |
|---|---|---|---|---|
| 9,081,805 | B1 * | 7/2015 | Stamen | G06F 21/602 |
| 9,355,259 | B1 * | 5/2016 | Choo | H04L 9/0863 |
| 10,463,774 | B2 * | 11/2019 | Ballantyne | G06F 21/51 |
| 10,698,618 | B1 * | 6/2020 | Barzik | G06F 11/0751 |
| 11,222,130 | B2 * | 1/2022 | Nagesha Rao | H04L 63/0428 |
| 2004/0240446 | A1 * | 12/2004 | Compton | H04L 45/566 |
| | | | | 370/252 |

(Continued)

OTHER PUBLICATIONS

Bandal et al., "Key exchange privacy preserving technique in cloud computing," https://www.irjet.net/archives/V5/i3/IRJET-V5I3736.pdf, International Research Journal of Engineering and Technology (IRJET), vol. 5, Issue 3, Mar. 2018, 5 pgs.

(Continued)

*Primary Examiner* — Sharif E Ullah
(74) *Attorney, Agent, or Firm* — Eric W. Chesley

(57) ABSTRACT

Provided is a method for method for encrypting log file data in a multitenant database. The method comprises receiving a request to secure data of a tenant in a multitenant database. The method further comprises obtaining a symmetric encryption key that is specific to the tenant. The method further comprises encrypting data of the tenant using the symmetric encryption key. The data that is encrypted is stored in the multitenant database. The method further comprises encrypting a set of log file entries using the symmetric encryption key. The set of log file entries are associated with data of the tenant.

18 Claims, 9 Drawing Sheets

(56) References Cited

U.S. PATENT DOCUMENTS

| | | | | |
|---|---|---|---|---|
| 2005/0015511 | A1* | 1/2005 | Izmailov | H04L 12/18 709/238 |
| 2005/0195823 | A1* | 9/2005 | Chen | H04L 7/02 370/432 |
| 2011/0107408 | A1* | 5/2011 | Blot-Lefevre | G06Q 10/10 726/7 |
| 2011/0145528 | A1* | 6/2011 | Watanabe | G06F 11/1456 711/E12.103 |
| 2012/0192261 | A1* | 7/2012 | Blot-Levevre | H04L 67/141 726/10 |
| 2013/0007453 | A1* | 1/2013 | Benantar | H04L 9/3226 713/169 |
| 2017/0104587 | A1* | 4/2017 | Barney | H04L 9/0841 |
| 2019/0073152 | A1* | 3/2019 | Nagle | G06F 3/067 |
| 2019/0097791 | A1* | 3/2019 | Hersans | H04L 9/0894 |
| 2019/0229908 | A1* | 7/2019 | Peddada | G06F 21/602 |
| 2020/0053065 | A1* | 2/2020 | Wisniewski | H04L 63/06 |
| 2020/0250325 | A1* | 8/2020 | Chong | G06F 21/6218 |
| 2021/0328789 | A1* | 10/2021 | Hosur | H04L 9/0894 |
| 2021/0377020 | A1* | 12/2021 | Kashid | H04L 9/083 |
| 2022/0247554 | A1* | 8/2022 | Peddada | H04L 9/0897 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

Unknown, "Transparent Data Encryption (TDE)," SQL Server, Microsoft Docs, https://docs.microsoft.com/en-us/sql/relational-databases/security/encryption/transparent-data-encryption?view=sql-server-ver15, 5/9/201, 13 pgs., printed Jul. 20, 2021.

Waizenegger, T. "Data security in multi-tenant environments in the cloud," https://elib.uni-stuttgart.de/handle/11682/2916, published Apr. 13, 2012, 95 pgs.

Yarava et al., "Efficient and Secure Cloud Storage Auditing Based on the Diffie-Hellman Key Exchange," https://www.researchgate.net/publication/334123417_Efficient_and_Secure_Cloud_Storage_Auditing_Based_on_the_Diffie-Hellman_Key_Exchange/link/5da98174299bf111d4be438a/download, International Journal of Intelligent Engineering and Systems, Jun. 2019, DOI: 10.22266/ijies2019.0630.06, 10 pgs.

* cited by examiner

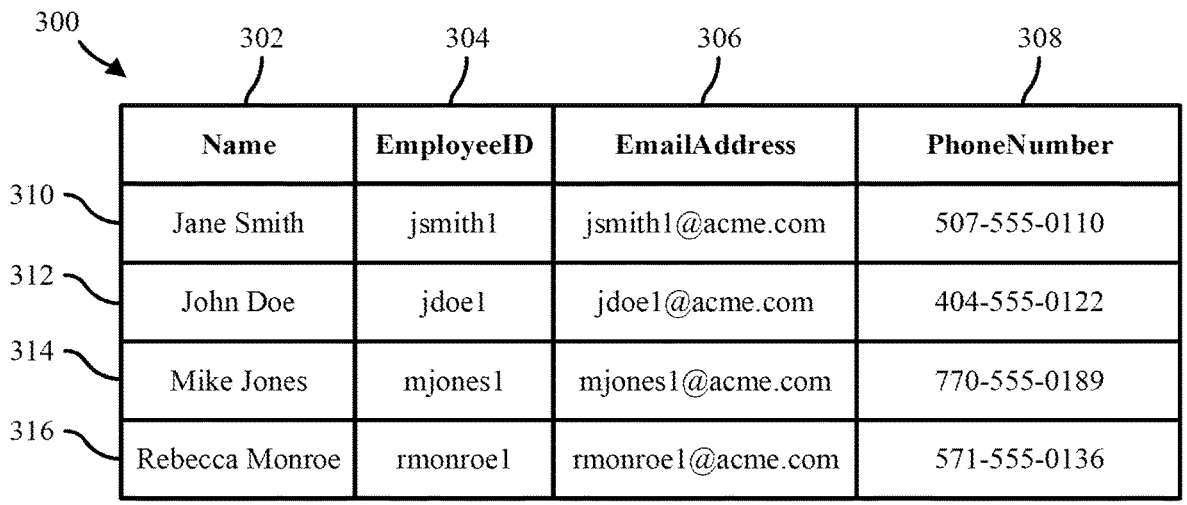
FIG. 3
```
UPDATE employees
SET
    EmailAddress = 'jdoe1@au.acme.com',
    PhoneNumber = '04 5555 0122'
WHERE
    EmployeeID = jdoe1;
```
400
FIG. 4
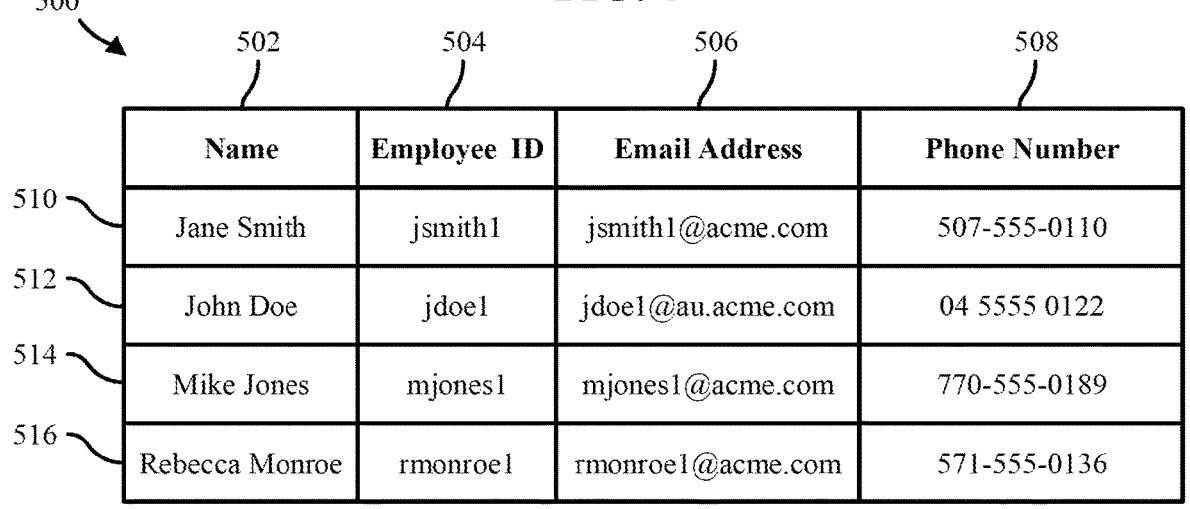
FIG. 5

| Date | User | TenantID | Query |
|---|---|---|---|
| 2021-05-27 06:59:25 | root | T1 | UPDATE employees SET EmailAddress = 'jdoe1@au.acme.com', PhoneNumber = '04 5555 0122' WHERE EmployeeID = jdoe1; |
| 2021-05-27 06:54:01 | root | T3 | SELECT * FROM review r, item 1 WHERE i.i_id = r.i_id |
| 2021-05-27 06:46:33 | root | T6 | UPDATE useracct SET name =:1 WHERE u_id=:2 |
| 2021-05-27 06:46:07 | User1 | T1 | INSERT INTO review(id, comments, date) VALUES ('2368', 'Review approved', '01/01/2021') |

FIG. 6

| Date | User | TenantID | Query |
|---|---|---|---|
| 2021-05-27 06:59:25 | root | T1 | LxwsXcA4joqu/JWcVbmXZNq74TlxoMnH9H79SZKnGzyB8ycLf5ZAlIXCQuMYiRMQxfLprlqA/HicKjdxQRst5A= |

FIG. 7

| Date | User | TenantID | Query |
|---|---|---|---|
| 2021-05-27 06:59:25 | root | T1 | LxwsXcA4joqu/JWcVbmXZNq74TlxoMnH9H79SZKnGzyB8ycLf5ZAlIXCQuMYiRMQxfLprlqA/HicKjdxQRst5A= |
| 2021-05-27 06:54:01 | root | T3 | yT4UBtrb7FLwYJkAfjG+mVKe4VOVisdoxMEpBr58x9srOwj9OVTGzioyHH3ovPmObKHOGo3hANpSLMN6kwHUKQ= |
| 2021-05-27 06:46:33 | root | T6 | nqPLDoq0SsO27/mbcHZq5GXcr+D96+QUl8Naf2QbvrIDQXiXBl3acTP7wfb9tUt2 |
| 2021-05-27 06:46:07 | User1 | T1 | pVMs9RFyvgCnov/cm+DDo6yJ+dUMLS1hbv+vQBcGSVdAtMxJcLgWjO0XYd04f8Q6+RvWJ4lNYS30vAnwad9OY0p8Zda9wry+3MzIB3lqoMQqzm/CE04L1SU8mLoTgc6k |

FIG. 8

ENCRYPTION OF DATABASE LOG FILES

BACKGROUND

The present disclosure relates generally to the field of database management, and more particularly to encrypting database log files in multitenancy database systems.

Multitenancy is an architectural framework where a single instance of software and/or hardware serves multiple tenants. As such, multitenancy systems are considered "shared," as opposed to "dedicated" or "isolated" systems where the system is dedicated to a single tenant. Multitenancy is commonly employed in cloud computing systems and environments.

SUMMARY

Embodiments of the present disclosure include a method, computer program product, and system for encrypting log file data in a multitenant database. The method comprises receiving a request to secure data of a tenant in a multitenant database. The method further comprises obtaining a symmetric encryption key that is specific to the tenant. The method further comprises encrypting data of the tenant using the symmetric encryption key. The data that is encrypted is stored in the multitenant database. The method further comprises encrypting a set of log file entries using the symmetric encryption key. The set of log file entries are associated with data of the tenant.

Further embodiments of the present disclosure include a method, computer program product, and system for encrypting log file data in a multitenant database during processing of queries related to the multitenant database. The system comprises a memory and a processor. The processor is communicatively couple to the memory. The processor is further configured to perform a method. The method comprises receiving a query against a multitenant database. The query is associated with data for a first tenant of a plurality of tenants. Each of the plurality of tenants has data in the multitenant database. The method further comprises identifying a first symmetric key. The first symmetric key is associated with the first tenant. The method further comprises processing the query. The method further comprises generating a first log record. The first log record is generated based on the query. The method further comprises encrypting the first log record using the first symmetric key. The method further comprises storing the first log record in a transaction log for the multitenant database.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 3 illustrates an example database table, in accordance with embodiments of the present disclosure.

FIG. 4 illustrates an example SQL query for modifying the database table of FIG. 3, in accordance with embodiments of the present disclosure.

FIG. 5 illustrates an example database table after the SQL query of FIG. 4 is executed against the database table of FIG. 3, in accordance with embodiments of the present disclosure.

FIG. 6 illustrates an example shared transaction log for a database system, in accordance with embodiments of the present disclosure.

FIG. 7 illustrates an example shared transaction log entry that has been encrypted using user-defined encryption, in accordance with embodiments of the present disclosure.

FIG. 8 illustrates the example shared transaction log of FIG. 6 after the individual log entries have been encrypted using encryptions keys specific to each tenant, in accordance with embodiments of the present disclosure.

Figure 1:
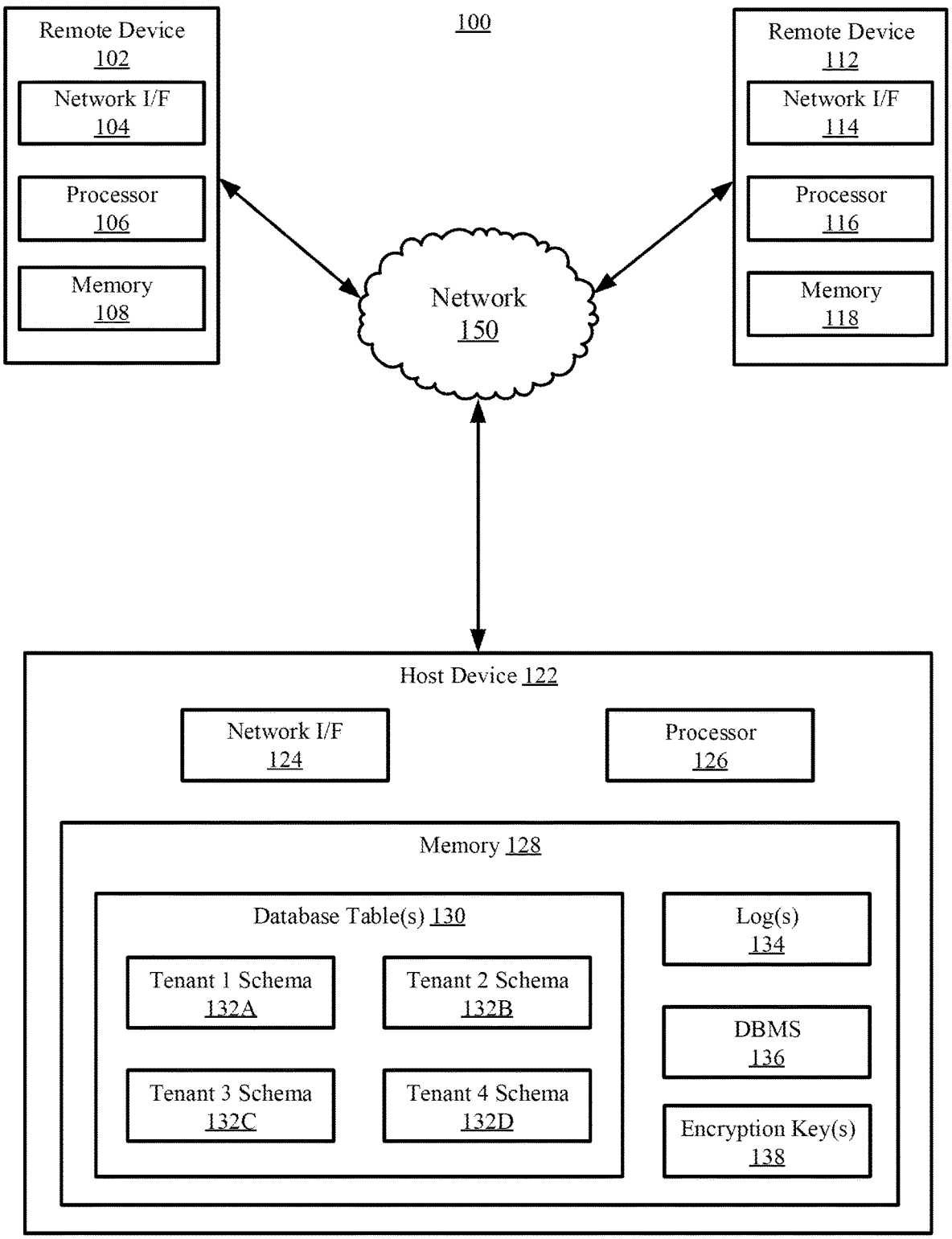
FIG. 1 illustrates a block diagram of an example computing environment in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of database management, and in particular to encrypting database log files in multitenancy database systems. While the present disclosure is not necessarily limited to such applications, various aspects of the disclosure may be appreciated through a discussion of various examples using this context.

Multitenancy is an important feature of many cloud computing environments. Multitenancy allows tenants to share resources (e.g., software, servers, databases, etc.) while maintaining data privacy such that tenants are only able to access their own data. This can provide cost savings and increase scalability of a cloud system.

There are numerous different database architectures that can be used to support a multitenancy system. Generally speaking, four of the most common architectures are (i) single database, shared schema; (ii) single database, separate schema; (iii) database per tenant; and (iv) multiple databases, multiple tenants per database, shared schema.

In a single database, shared schema architecture, a single database contains data for every tenant, and each tenant's data is stored in the same set of tables. As such, each table has an identifier or tenant ID column to identify which tenant owns each record. This architecture has the advantage of being generally the easiest to maintain, having relatively low complexity, and being easy to add tenants to. On the other hand, such database systems tend to have lower security, worse flexibility, particularly when housing data for tenants with different amounts of data and usage, and worse scalability.

In a single database, separate schema architecture, a single database contains data for every tenant, but each tenants has its own set of tables with a tenant-specific schema. This helps ensure that the tenant data has more isolation, and therefore better security, when compared to single database, shared schema architecture. The scalability of the system is also improved relative to the single data-based shared schema architecture as a result of portioning the database into smaller tables. However, the complexity of the system is increased, and it can be more difficult to add new tenants.

In a database per tenant architecture, each tenant has its own database. The databases for multiple tenants may nevertheless be housed on the same server(s). This generally provides the highest level of tenant isolation, and includes support options for shared servers or even isolated servers. Therefore, this architecture is generally the most secure. When sharing servers, scalability of these systems is also very high as scale-out and scale-up are both options. However, the maintainability and complexity of these systems are generally higher than the previously discussed approaches, and adding tenants can be more involved as new schemas need to be created.

Finally, a multiple databases, multiple tenants per database, shared schema architecture is a hybrid of the single database, shared schema architecture and the database per tenant architecture. It generally includes a pool of databases spread out over one or more servers, with each database hosting data for multiple tenants. It provides some tenant isolation as each database only contains data for a subset of the tenants (as opposed to all tenants), though it is less secure than the database per tenant architecture. Similarly, it is generally more maintainable and less complex than the database per tenant architecture, but it is less maintainable and more complex than the single database, shared schema architecture. It also maintains relatively high scalability, as one again scale-out and scale-up are both options.

Embodiments of the present disclosure are discussed with respect to the single database, shared schema architecture, the single database, separate schema architecture, and the multiple databases, multiple tenants per database, shared schema architecture. However, it is to be understood that the above list of example multitenancy architectures, as well as the embodiments described herein, are provided for illustrative purposes only, and they are not meant to be limiting. Embodiments of the present disclosure may apply to other multitenancy architectures, as would be understood by persons of ordinary skill in the art.

Regardless of the specific architecture used, it is common for multitenancy databases to have one or more shared database backups and log files that include information for each tenant. For example, a transactional log file may include a list of all queries or other transactions that have occurred on a given database, even if the queries were from different tenants. The logs may be kept forever or they may be periodically deleted (e.g., according to audit requirements, such that they only contain transactions that occur between database backups, etc.). In order to enable features such as database rollback and recovery, particularly between backups, these logs are generally not encrypted, or they are encrypted using a single key for all tenants. This presents a security vulnerability as it may be possible for the backup/log data, which is generally not encrypted, to be inappropriately accessed, such as by a database operator. These logs can be read by a utility, and certain sections of the data might be compromised. For example, while this may not expose the entire database in most cases, the data added or changed between database updates may be visible to the database operator.

Embodiments of the present disclosure address these and other issues with current database systems by utilizing tenant-defined encryption of the tenant's entries on the log files. Embodiments include generating a unique encryption key for each tenant which will be used to encrypt the data in the table as well as logs. This encryption key may be generated based on Diffie-Hellman key exchange algorithm. The cloud provider (database engine) and tenant (user) may together arrive at this key. The keys may be stored in the database in a secure area that is not accessible to database operators or admin. Accordingly, embodiments of the present disclosure may increase the security of the log files and prevent tenant's data from inadvertent and/or intentional misuse.

In some embodiments, each user is provided a separate schema within the database. This schema is created when the user subscribes to the database service. In other embodiments, each tenant may not have its own schema and the database may be a shared schema type database. Regardless of whether the database is a shared schema or separate schema database, at subscription/registration time, an encryption key will be generated. In some embodiments, the encryption key can be generated using a Diffie-Hellman key exchange algorithm.

For example, when a new user subscribes to the database for the first time, the user and the service provider collaboratively generate an encryption key using a Diffie-Hellman algorithm. This may be done by an automated service that is transparent to the tenant but not to database operators or admin. As an example, a database engine and the user publicly agree to use a modulus p=23 and base g=5 (which is a primitive root modulo 23). The database engines chooses a secret integer a=4, then sends user $A=g^a$ mod p. In this example, the database engine would send $A=5^4$ mod 23=4. The user chooses a secret integer b=3, and then the user sends the database engine $B=g^b$ mod p. In this example, the user sends $B=5^3$ mod 23=10. The database engine then computes $s=B^a$ mod p to arrive at the shared secret/key. In this case, the database engine computes $s=10^4$ mod 23=18. Similarly, the user computes $s=A^b$ mod p to determine the shared secret/key. In this example, the user computes $s=4^3$ mod 23=18. Accordingly, both the database engine and the user now share a secret key (the number 18).

It is to be understood that in practice, the actual values will be much larger such that even if someone were to access the publicly traded information, they would be unable to use it to determine the secret information or to generate the key. Once the shared secret key is determined, any suitable symmetric-key algorithm can be used to encrypt/decrypt the data in the logs utilizing the shared secret key. Examples of popular symmetric-key algorithms include, without limitation, Twofish, Serpent, Advanced Encryption Standard (AES), Camellia, Salsa20, ChaCha20, Blowfish, CAST5, Kuznyechik, RC4, Data Encryption Standard (DES), Triple Data Encryption Standard (3DES), Skipjack, Safer, and International Data Encryption Algorithm (IDEA).

In some embodiments, the database engine will store the encryption key in metadata tables which won't be accessible to database administrators or other users. This table can be secured by mechanisms like role-based access control (RBAC) or label-based access control (LBAC). A pseudo-user can be created during database creation time which is specific to the database instance and no other roles like DBADM or SYSADM has access to data stored by this pseudo-user. If the database does not support RBAC/LBAC schemes, this table/view can be hidden from DBADM/SYADM roles, and only the database engine process will have access to the table. The table will contain the schema name of the user and the corresponding encryption key, so whenever the user executes a database query or operation, the database engine will look up this hidden table for the encryption key specific to the user and use it for encrypting and decrypting the user data.

The system will perform typical database operations in a similar fashion to how they are currently done. For example:

When the user writes some data to a table, the database will use the encryption key specific to the user to encrypt the data and store it in the table (disk). The database can figure out the authenticity of the user by IAM tokens or other standard security mechanisms used by cloud service providers.

When the user reads data from a table, the database reads the data in encrypted form and sends it to the user while still encrypted. The user can use the encryption key to decrypt the data and read its contents.

For operations in buffer pools or other database heaps, user data will be read in encrypted form in buffer pool/database heaps. For processing operations like filter, sort, group by, joins, etc., the data will be decrypted in memory. The result of the processing will be encrypted before writing it back to the disk or returning the data back to the user over the network.

User data will be in encrypted form while writing it to transaction log. To distinguish the logs for different users, the database engine may write the schema name in the transaction log header. So when the database engine has to read from transaction logs, it knows which user specific encryption key to use for decrypting the logs. Alternatively, for shared logs, a tenant or user ID may be appended in an unencrypted form to the record in the log.

While embodiments of the present disclosure utilize the Diffie-Hellman key exchange algorithm, it is to be understood that this is just an example provided for illustrative purposes. In some embodiments, the key may be generated using a different algorithm, and/or the user may send the symmetric key to the database engine directly. This may disadvantageously expose the key while it is being sent, but it may increase flexibility of the system.

In some embodiments, the symmetric key may be generated by the user alone and then sent to the database engine using a secure, asymmetrically encrypted communication. For example, the symmetric encryption key can be generated by the user, encrypted using a public encryption key of the database engine, and then decrypted by the database engine using a private key of the database engine. This may take advantage of the flexibility of allowing the tenant to create their own symmetric encryption key while still ensuring that it is securely received by only the database engine.

It is to be understood that the aforementioned advantages are example advantages and should not be construed as limiting. Embodiments of the present disclosure can contain all, some, or none of the aforementioned advantages while remaining within the spirit and scope of the present disclosure.

Turning now to the figures, FIG. 1 illustrates a block diagram of an example computing environment 100 in which illustrative embodiments of the present disclosure may be implemented. In some embodiments, the computing environment 100 may include two remote devices 102 and 112 and a host device 122.

Consistent with various embodiments, the host device 122 and the remote devices 102 and 112 may be computer systems. The remote devices 102 and 112 and the host device 122 may include one or more processors 106, 116, and 126 and one or more memories 108, 118, and 128, respectively. The remote devices 102 and 112 and the host device 122 may be configured to communicate with each other through an internal or external network interface 104, 114, and 124. The network interfaces 104, 114, and 124 may be, for example, modems or network interface cards. The remote devices 102 and 112 and/or the host device 122 may be equipped with a display or monitor. Additionally, the remote devices 102 and 112 and/or the host device 122 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the remote devices 102 and 112 and/or the host device 122 may be servers, desktops, laptops, or hand-held devices, such as smart phones or tablets.

The remote devices 102 and 112 and the host device 122 may be distant from each other and communicate over a network 150. In some embodiments, the host device 122 may be a central hub from which remote devices 102 and 112 can establish a communication connection, such as in a client-server networking model. Alternatively, the host device 112 and remote devices 102 and 112 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an internet, or an intranet. In certain embodiments, the remote devices 102 and 112 and the host device 122 may be local to each other, and communicate via any appropriate local communication medium. For example, the remote devices 102 and 112 and the host device 122 may communicate using a local area network (LAN), one or more hardwire connections, a wireless link or router, or an intranet. In some embodiments, the remote devices 102 and 112 and the host device 122 may be communicatively coupled using a combination of one or more networks and/or one or more local connections. For example, the first remote device 102 may be hardwired to the host device 122 (e.g., connected with an Ethernet cable) while the second remote device 112 may communicate with the host device using the network 150 (e.g., over the Internet).

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

In some embodiments, the remote devices 102 and 112 may be used to query data stored on the host device for users. For example, the remote devices 102 and 112 may include a user interface (UI) and one or more applications (not shown) that access, manipulate, generate, or otherwise interact with data that is stored in the database tables 130. The data access applications may be in the form of a web browser or any other suitable software module, and the UI may be any type of interface (e.g., command line prompts, menu screens, graphical user interfaces). The UI may allow a user to interact with the remote devices 102 and 112 to retrieve and analyze data that has been stored by the host device 122.

In some embodiments, the host device 122 may include one or more database tables 130 in one or more databases, one or more logs 134, and one or more encryption keys 138 stored in the memory 128. The memory may further include a database management system (DBMS) 136, also referred to herein as being or containing a database engine. The database tables 130 may be portioned by tenant, with each tenant having its own schema. In other words, each tenant may have its own partitioned set of tables to store its data. For example, the database tables 130 may be partitioned in a first schema 132A for a first tenant, a second schema 132B for a second tenant, a third schema 132C for a third tenant, and a fourth schema 132D for a fourth tenant. Accordingly, the database may have a single database, separate schema architecture. However, it is to be understood that this is shown for illustrative purposes only, and other database architectures not otherwise inconsistent with this disclosure are contemplated.

The memory 128 further comprises one or more logs 134. The logs 134 may include, for example, transaction logs that store individual transactions (e.g., read requests, write requests, etc.) against the databases. The logs 134 may be maintained for any number of purposes, including, for example, audit or data recovery/rollback purposes. In some embodiments, the logs 134 are shared between the tenants such that any individual log comprises data for multiple tenants. In other embodiments, such as a database per tenant embodiments, each log 134 may contain data for only one tenant. In some embodiments, each log 134 may comprise data for multiple, but not all, tenants. For example, in a multiple databases, multiple tenants per database architecture (with shared or separate schemas), each database may include a shared log 134 for all tenants in that database.

The memory further comprises one or more encryption keys 138. The encryption keys 138 may be used to encrypt the database tables 130 and the logs 134, as discussed herein. Each tenant in the database hosted by the host device 122 may have its own encryption key 138. The encryption keys 138 may be stored in a secure area of the memory 128 such that the keys 138 are not accessible by, or transparent to, the tenants or database operators or admin.

The DBMS 136 may be software that is configured to manage the database tables 130. For example, the DBMS 136 may be responsible for partitioning the databases and responding to tenant requests/queries against their data. The DBMS 136 may also be responsible for performing the encryption operations disclosed herein. For example, the DBMS may be responsible for generating, along with the tenants, the encryption keys 138. For example, the DBMS 136 may generate the key 138 for a tenant by perform a Diffie-Hellman key exchange operation with the tenant. The DBMS 136 may also be responsible for securing the tenant's data and the logs 134 by encrypting them using the encryption keys 138.

While FIG. 1 illustrates a computing environment 100 with a single host device 122 and two remote devices 102 and 112, suitable computing environments for implementing embodiments of this disclosure may include any number of remote devices and host devices. The various models, modules, systems, and components illustrated in FIG. 1 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a first set of database tables (e.g., storing data for the first and second tenants), and the second host device may include a second set of database tables (e.g., storing data for the third and fourth tenants).

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
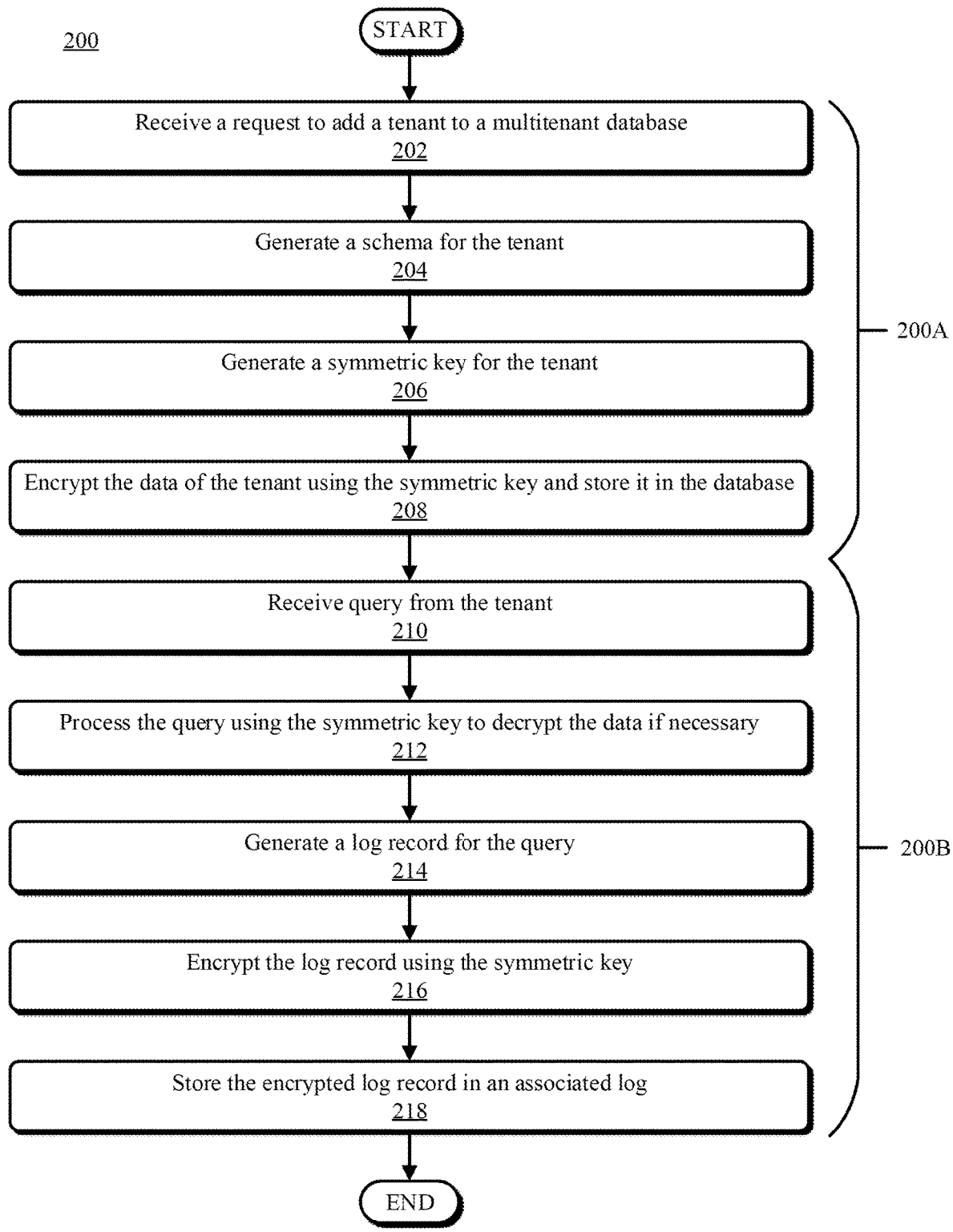
FIG. 2 illustrates a flowchart of an example method for user-defined encryption of shared log files in a database system, in accordance with embodiments of the present disclosure.

Referring now to FIG. 2, illustrated is a flowchart of an example method 200 for user-defined encryption of shared log files in a database system, in accordance with embodiments of the present disclosure. The method 200 may be performed by hardware, firmware, software executing on a processor, or any combination thereof. For example, the method 200 may be performed by a processor (e.g., in a host device 122). The method 200 may contain multiple subprocesses. For example, the method 200 may contain a first subprocess 200A in which a tenant is registered with a cloud provider and their data encryption process is set up. Additionally, the method 200 may contain a second subprocess 200B in which the queries are processed for the tenant after registration. While these are shown as subprocesses of a single method 200, it is to be understood that both subprocesses 200A, 200B could be performed independently as their own methods.

The method 200 may begin at operation 202, where the processor receives a request to add a tenant to a multitenant database. As discussed herein, the multitenant database may be in any suitable architectural arrangement (e.g., shared database, separate schema). The request to add the tenant may be received by the tenant registering or purchasing cloud services from a cloud provider. In some embodiments, instead of receiving a request to add a new tenant at operation 202, the processor may receive a request to secure the data for an existing tenant. The request to secure the data may indicate that the existing tenant wants to set up secure storage of the tenant's data itself as well as any associated log files.

At operation 204, the processor generates a schema for the tenant. As used herein, a schema is an abstract design that represents the storage of a tenant's data in a database. It describes both the organization of data and the relationships between tables in a given database. Database systems that have separate schemas allow each tenant to define the structure of their underlying data. These systems also use separate (e.g., partitioned) tables for each tenant, which increases tenant isolation even when the tables are in the same underlying database.

In some embodiments, operation 204 is not performed. For example, embodiments of the present disclosure may be deployed in a shared schema database system (whether a single database or multiple database variety). In these embodiments, there may be no need to generate a schema for a new tenant since they will have to use the same schema that other tenants are using. Similarly, in embodiments where a request to secure the data of an existing tenant is received instead of a request to add a tenant, there may be no need to generate a schema even if the database system is a separate schema system as the existing tenant would already have an associated schema.

At operation 206, the processor generates (or receives) a symmetric key for the tenant. Operation 206 may include the processor generating the key by itself and sending it to the tenant, the tenant generating the key itself and sending it to the processor, or the processor and tenant collaboratively generating the key. In some embodiments, the processor and tenant may generate the symmetric key by performing a Diffie-Hellman key exchange operation. As discussed herein, the Diffie—Hellman key exchange method allows two parties (e.g., the processor and the tenant) that have no prior knowledge of each other to jointly establish a shared secret key over an insecure channel. This key can then be used to encrypt data for the tenant.

As described herein, in some embodiments, the symmetric key may be generated by the tenant alone. The generated symmetric key can then be sent to the processor. The key can be sent in either an unsecured fashion or in a secured communication using (e.g., key wrapping), for example, public-private encryption. Any suitable key management method for generating and sharing the symmetric key may be utilized, as would be understood by persons of ordinary skill.

At operation 208, the processor encrypts the tenant's data using the symmetric key. The processor further stores the encrypted data in the database. The data may be encrypted using any suitable symmetric encryption algorithm. For example, the data may be encrypted using a 128-bit AES algorithm. As new data is added to the database, it is also encrypted by the processor using the symmetric key.

In some embodiments, such as those where the tenant already stored data in the database prior to generating the symmetric key (e.g., in response to a request to secure the data), the processor may encrypt the log data for the tenant at operation 208. In some embodiments, the logs may be shared logs that contain data for multiple tenants, and individual entries/records in the shared log that correspond to the tenant whose data is being secured may be encrypted using the symmetric key. An example of this type of encrypted log is discussed in reference to FIG. 8. In other embodiments, each tenant may have its own set of logs, and the entirety of the log files may be encrypted using the symmetric key. An example of this type of encrypted log is discussed in reference to FIG. 9. In these embodiments, the header of the log files may include the schema ID or tenant ID of the tenant so the processor knows which symmetric key to use when encrypting or decrypting the log files.

After registering and encrypting the tenant's data, the processor receives a query from the tenant at operation 210. The query may be any type of database query, such as a query to read or modify data stored in the database. The processor may then process the query at operation 212. Depending on the type of query, the processor may need to decrypt the data using the symmetric key in order to process the query.

For example, when the user writes some data to a table, the database will use the symmetric key specific to the tenant to encrypt the data and store it in the table (disk). The database can figure out the authenticity of the user by IAM tokens or other standard security mechanisms used by cloud service providers in order to ensure that the user is permitted to modify the tenant's data.

When the user reads data from a table, the database reads the data in encrypted form and sends it to the user while still encrypted. The user can use the symmetric key to decrypt the data and read its contents. Again, prior to sending the encrypted data to the user, the processor may authenticate the user.

For operations in buffer pools or other database heaps, tenant data will be read in encrypted form in the buffer pool/database heaps. For processing operations like filter, sort, group by, joins, etc., the data will be decrypted in memory using the symmetric key. The result of the processing will be encrypted before writing it back to the disk or returning the data back to the authenticated user over the network.

At operation 214, the processor generates one or more log records related to the query. For example, the system may include a transaction log that stores the queries of all transactions that have occurred since the last database backup. This log may be used in the event that the database needs to be rolled back to a previous state. Logs may also be kept for audit purposes. The one or more log records may keep any data necessary for such purposes. For example, the logs may contain the timestamp of individual transactions, an identifier of the user who executed the transaction, a tenant whose data was impacted (in the case of a shared log), as well as a copy of the query that was executed. Accordingly, when a query is executed, the processor may generate a record that contains this information.

It is to be understood that the log records discussed herein are example log records only, and that they are provided for illustrative purposes. These log records should not be construed as limiting. As would be recognized by a person of ordinary skill, the logs may contain all, some, or none of the information described herein, and they may additionally (or alternatively) contain other information.

At operation 216, the processor encrypts the generated log record(s) using the symmetric key for the tenant. As discussed above, the log record may be encrypted using any suitable symmetric key encryption algorithm. For example, the log may be encrypted using a 128-bit AES encryption process. After encrypting the log record at operation 216, the processor may store the encrypted log record in the associated log at operation 218 and the method may end.

In some embodiments, the log may include only records for a single tenant. In these embodiments, instead of encrypting individual records, the entire log may be encrypted at once. Accordingly, operations 216 and 218 may include decrypting the log file, adding the newly generated record to the log file, and then re-encrypting the entire log file. In this way, the entire log is encrypted as a unit instead of each individual records being encrypted separately. This may beneficially increase the security of the encryption, depending on the encryption method used, as it reduces the odds that multiple, separately encrypted records could be compared to each other to discern information about the encryption methods of the records themselves.

FIGS. 3-9 illustrate an example of the method 200, and in particular of the subprocess 200B, as applied to an example database table. Referring now to FIG. 3, illustrated is an example database table 300, in accordance with embodiments of the present disclosure. The example database table 300 is a database table that includes data on employees of the tenant.

In particular, the database table 300 includes four different fields: a Name field 302, an EmployeeID field 304, an EmailAddress field 306, and a PhoneNumber field 308. The database table 300 has four different records 310-316, each of which belonging to a different employee. The database table 300 may be queried by authorized users to read or change data stored in the table 300.

Referring now to FIG. 4, illustrated is an example SQL query 400 for modifying the database table 300 of FIG. 3, in accordance with embodiments of the present disclosure. As shown in FIG. 4, the SQL query 400 updates the database table called "employees" by changing the email address and phone number for the employee that has the EmployeeID of jdoe1. In other words, the SQL query 400 updates John Doe's email address and phone number, which are found in the second record 312 in the database table 300.

FIG. 5 illustrates an updated database table 500 after the SQL query 400 of FIG. 4 is executed against the database table 300 of FIG. 3, in accordance with embodiments of the present disclosure. As shown in FIG. 5, the updated database table 500 still includes four fields 502-508 and four records 510-516. However, the record associated with John Doe (i.e., the second record 512) has been updated to include his new email address and phone number. The other records 510, 514, 516 were not impacted by the SQL query 400, and therefore they remain unchanged from the original records 310, 314, 316.

In addition to updating the database table 500, the processor may store the SQL query 400 and corresponding information in a transaction log. This is shown in FIG. 6, which illustrates an example shared transaction log 600 for a database system, in accordance with embodiments of the present disclosure. The transaction log 600 may include four different fields: a Date field 602 that indicates when the transaction occurred, a User field 604 that indicates a user ID of the user who executed the transaction, a TenantID field 606 that indicates which tenant's data was affected by the transaction, and a Query field 608 that includes the specific query that was executed. The transaction log may include more or less data than shown in FIG. 6, and the transaction log 600 of FIG. 6 is provided for illustrative purposes only.

The transaction log 600 may be a shared transaction log for a database. As such, it may include records for a plurality of different tenants. For example, as shown in FIG. 6, the transaction log 600 includes two records (the first record 610 and the fourth record 616) for transactions against a first tenant's (T1) data, one record (the second record 612) for a transaction against a third tenant's (T3) data, and one record (the third record 614) for a transaction against a sixth tenant's (T6) data.

As shown in FIG. 6, the transaction log 600 is not encrypted. This is common for shared transaction logs in database systems. However, this presents a security vulnerability as someone who gains access to the transaction log 600 will be able to read some of the data. For example, analyzing the fourth record 616 would allow a system administrator to determine that the first tenant (T1) has a database titled "employees." By itself, this may not be particularly harmful. However, learning the exact names of various database tables can open them up to attack. Furthermore, some transactions will include more sensitive data. For example, analysis of the first record 610 results in the system administrator knowing that the first tenant has an employee whose employee ID is jdoe1, whose email address is jdoe1@au.acme.com, and whose phone number is 04 5555 0122.

In order to mitigate the harm caused by malicious access of the transaction log 600, the system may encrypt some or all of the data of the transaction log 600. FIG. 7 illustrated an example transaction log entry 710 that has been encrypted using user-defined encryption, in accordance with embodiments of the present disclosure. In particular, the transaction log entry 710 is an encrypted version of the first record 610 of the transaction log 600 shown in FIG. 6. As such, the transaction log entry 710 still includes the same four fields 602, 604, 606, and 608. The transaction log entry 710 has been encrypted using a symmetric key for the first tenant. In particular, the query field 708 has been encrypted using the symmetric key for the first tenant. The other fields 602-606 have not been encrypted. This may be done because the other fields do not contain sensitive data, and as such the costs of encrypting and decrypting these fields outweigh any potential benefits. However, in some embodiments, one or more of these fields 602-606 may also be encrypted based on user/system settings.

Referring now to FIG. 8, illustrated is the example shared transaction log of FIG. 6 after all of the individual log entries have been encrypted using encryptions keys specific to each tenant, in accordance with embodiments of the present disclosure. In particular, FIG. 8 includes an encrypted transaction log 700 with four entries 710-716. Each of the four entries corresponds to an entry in the unencrypted transaction log 600 shown in FIG. 6. Each entry 710 has been encrypted using a symmetric key for the associated tenant. For example, the first record 710 and the fourth record 716 have been encrypted using the symmetric key for the first tenant (T1), the second record 712 has been encrypted using the symmetric key for the third tenant (T3), and the third record 714 has been encrypted using the symmetric key for the sixth tenant (T6).

In the particular example shown in FIG. 8, each query has been encrypted using AES encryption with electronic codebook (ECB) mode with a 128-bit symmetric key and a base 64 output. The symmetric key for the first tenant is sixteen consecutive 1s, the symmetric key for the third tenant is sixteen consecutive 3s, and the symmetric key for the sixth tenant is sixteen consecutive 6s. In other words, the symmetric keys are:

Tenant 1=1111111111111111
Tenant 3=3333333333333333
Tenant 6=6666666666666666

It is to be understood that this encryption algorithm is just an example encryption algorithm, and any suitable symmetric encryption algorithm may be used. Additionally, each tenant has been encrypted using the same algorithm with a different key for simplicity. However, each tenant may independently choose the encryption algorithm, mode, and symmetric key. As such, log data may be encrypted using a variety of different algorithms and modes, in addition to using tenant-specific symmetric keys, in some embodiments. Similarly, while only the query field is encrypted, this is done for illustrative purposes only. In some embodiments, multiple fields are encrypted. Additionally, some embodiments may encrypt the field headers (e.g., Date) too.

Figure 9:
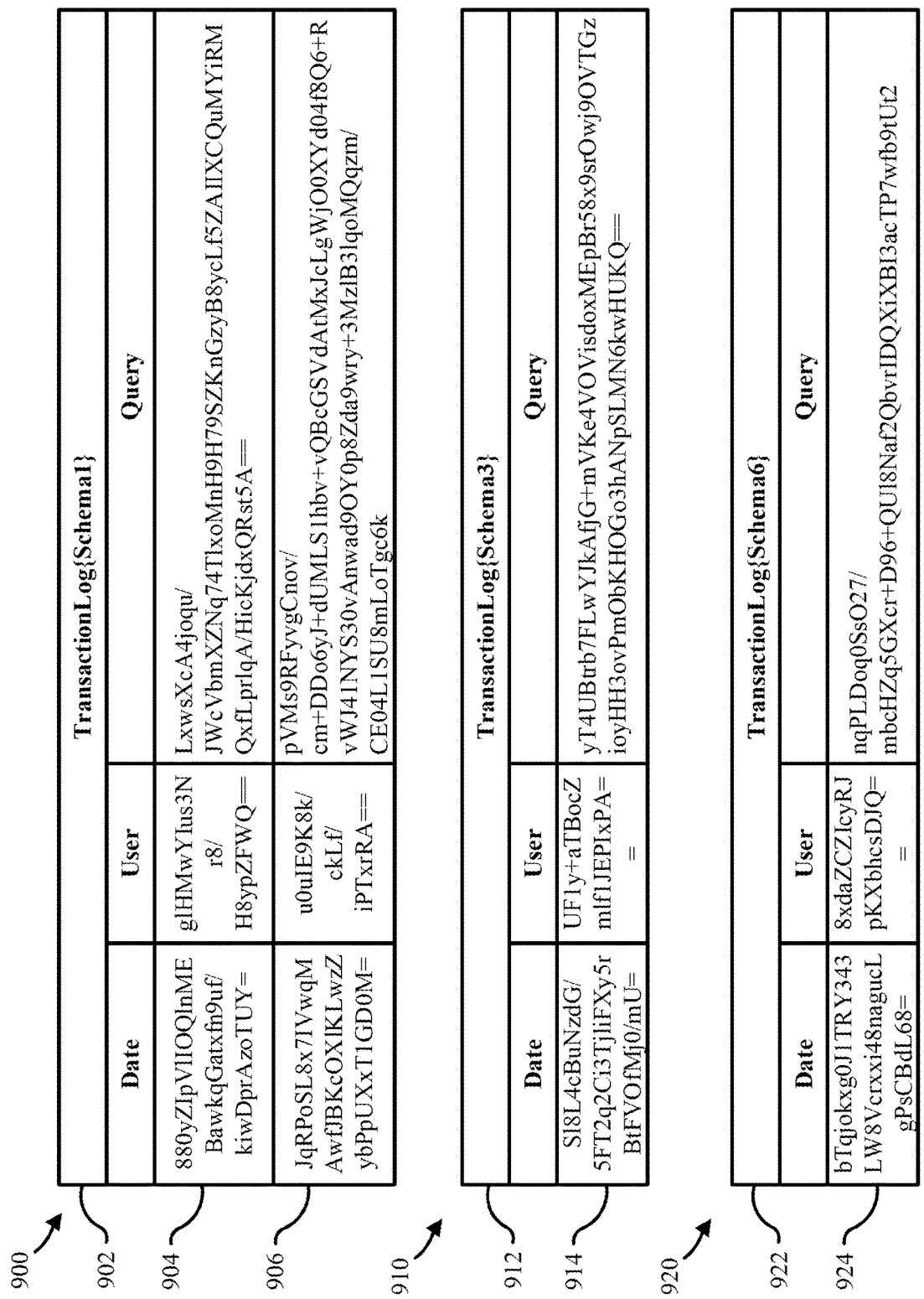
FIG. 9 illustrates a set of example transaction logs after the individual log entries have been encrypted using encryptions keys specific to each tenant, in accordance with embodiments of the present disclosure.

Referring now to FIG. 9, illustrated is a set of example transaction logs after the individual log entries have been encrypted using encryptions keys specific to each tenant, in accordance with embodiments of the present disclosure. In particular, the set of transaction logs 900, 910, 920 include separate transaction logs for each tenant. For example, the first transaction log 900 is specific to the first tenant, the second transaction log 910 is specific to the third tenant, and the third transaction log 920 is specific to the sixth tenant.

Each transaction log 900, 910, 920 contains substantially the same data as found in the transaction log 600 and the encrypted transaction log 700 shown in FIGS. 6 and 8, respectively. However, because FIG. 9 has different transaction logs for each tenant, the TenantID fields have been omitted. Additionally, the transaction logs 900, 910, 920 shown in FIG. 9 have the date and user fields encrypted, not just the query field. The date and user fields are encrypted using the same symmetric key as the corresponding query field (i.e., the symmetric key for the associated tenant).

Each transaction log 900, 910, 920 contains a header and one or more records. The header includes an identifier of the tenant or corresponding schema. The header may be used by the system to determine which symmetric key to use when decrypting or encrypting the data in the particular transaction log.

For example, the first transaction log 900 has a first header 902 and two records 904, 906. The first header 902 includes an identification of Schema1. This enables the system to know that the first transaction log 900 is associated with a first tenant, and therefore the symmetric key used to encrypt/decrypt the data of the first transaction log 900 is the symmetric key for the first tenant.

Likewise, the second transaction log 910 has a second header 912 and one record 914. The second header 912 includes an identification of Schema3, meaning the second transaction log 910 belongs to the third tenant and is encrypted/decrypted using the third tenant's encryption key.

Finally, the third transaction log 920 has a third header 922 and one record 924. The third header 922 includes an identification of Schema6, meaning the third transaction log 920 belongs to the sixth tenant and is encrypted/decrypted using the sixth tenant's encryption key.

Figure 10:
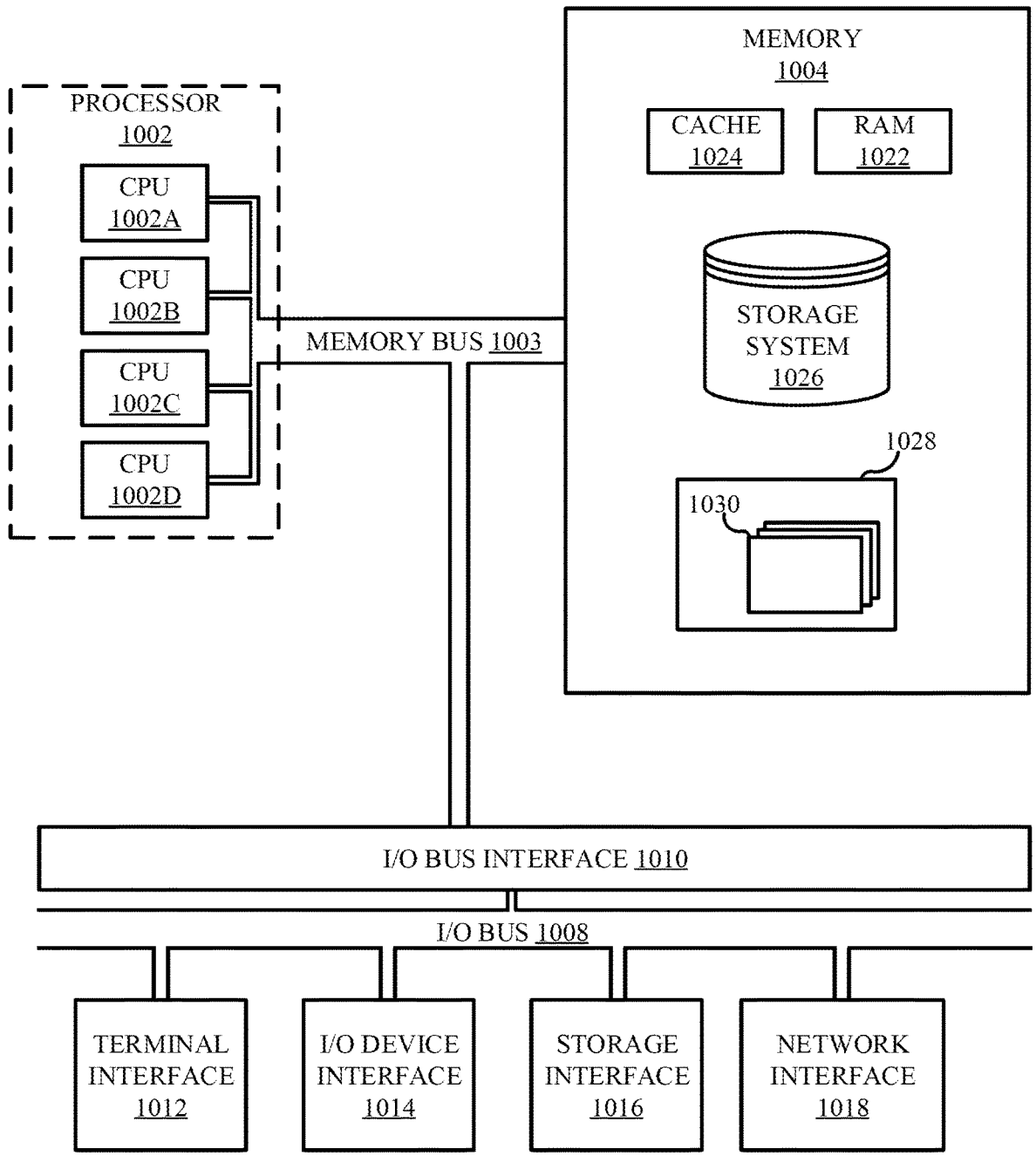
FIG. 10 illustrates a high-level block diagram of an example computer system that may be used in implementing one or more of the methods, tools, and modules, and any related functions, described herein, in accordance with embodiments of the present disclosure.

Referring now to FIG. 10, shown is a high-level block diagram of an example computer system 1001 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1001 may comprise one or more CPUs 1002, a memory subsystem 1004, a terminal interface 1012, a storage interface 1016, an I/O (Input/Output) device interface 1014, and a network interface 1018, all of which may be communicatively coupled, directly or indirectly, for inter-component communication via a memory bus 1003, an I/O bus 1008, and an I/O bus interface unit 1010.

The computer system 1001 may contain one or more general-purpose programmable central processing units (CPUs) 1002A, 1002B, 1002C, and 1002D, herein generically referred to as the CPU 1002. In some embodiments, the computer system 1001 may contain multiple processors typical of a relatively large system; however, in other embodiments the computer system 1001 may alternatively be a single CPU system. Each CPU 1002 may execute instructions stored in the memory subsystem 1004 and may include one or more levels of on-board cache.

System memory 1004 may include computer system readable media in the form of volatile memory, such as random access memory (RAM) 1022 or cache memory 1024. Computer system 1001 may further include other removable/non-removable, volatile/non-volatile computer system storage media. By way of example only, storage system 1026 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1004 can include flash memory, e.g., a flash memory stick drive or a flash drive. Memory devices can be connected to memory bus 1003 by one or more data media interfaces. The memory 1004 may include at least one program product having a set (e.g., at least one) of program modules that are configured to carry out the functions of various embodiments.

One or more programs/utilities 1028, each having at least one set of program modules 1030 may be stored in memory 1004. The programs/utilities 1028 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 1030 generally perform the functions or methodologies of various embodiments.

Although the memory bus 1003 is shown in FIG. 10 as a single bus structure providing a direct communication path among the CPUs 1002, the memory subsystem 1004, and the I/O bus interface 1010, the memory bus 1003 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1010 and the I/O bus 1008 are shown as single respective units, the computer system 1001 may, in some embodiments, contain multiple I/O bus interface units 1010, multiple I/O buses 1008, or both. Further, while multiple I/O interface units are shown, which separate the I/O bus 1008 from various communications paths running to the various I/O devices, in other embodiments some or all of the I/O devices may be connected directly to one or more system I/O buses.

In some embodiments, the computer system 1001 may be a multi-user mainframe computer system, a single-user system, or a server computer or similar device that has little or no direct user interface, but receives requests from other computer systems (clients). Further, in some embodiments, the computer system 1001 may be implemented as a desktop computer, portable computer, laptop or notebook computer, tablet computer, pocket computer, telephone, smart phone, network switches or routers, or any other appropriate type of electronic device.

It is noted that FIG. 10 is intended to depict the representative major components of an exemplary computer system 1001. In some embodiments, however, individual components may have greater or lesser complexity than as represented in FIG. 10, components other than or in addition to those shown in FIG. 10 may be present, and the number, type, and configuration of such components may vary. Furthermore, the modules are listed and described illustratively according to an embodiment and are not meant to indicate necessity of a particular module or exclusivity of other potential modules (or functions/purposes as applied to a specific module).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
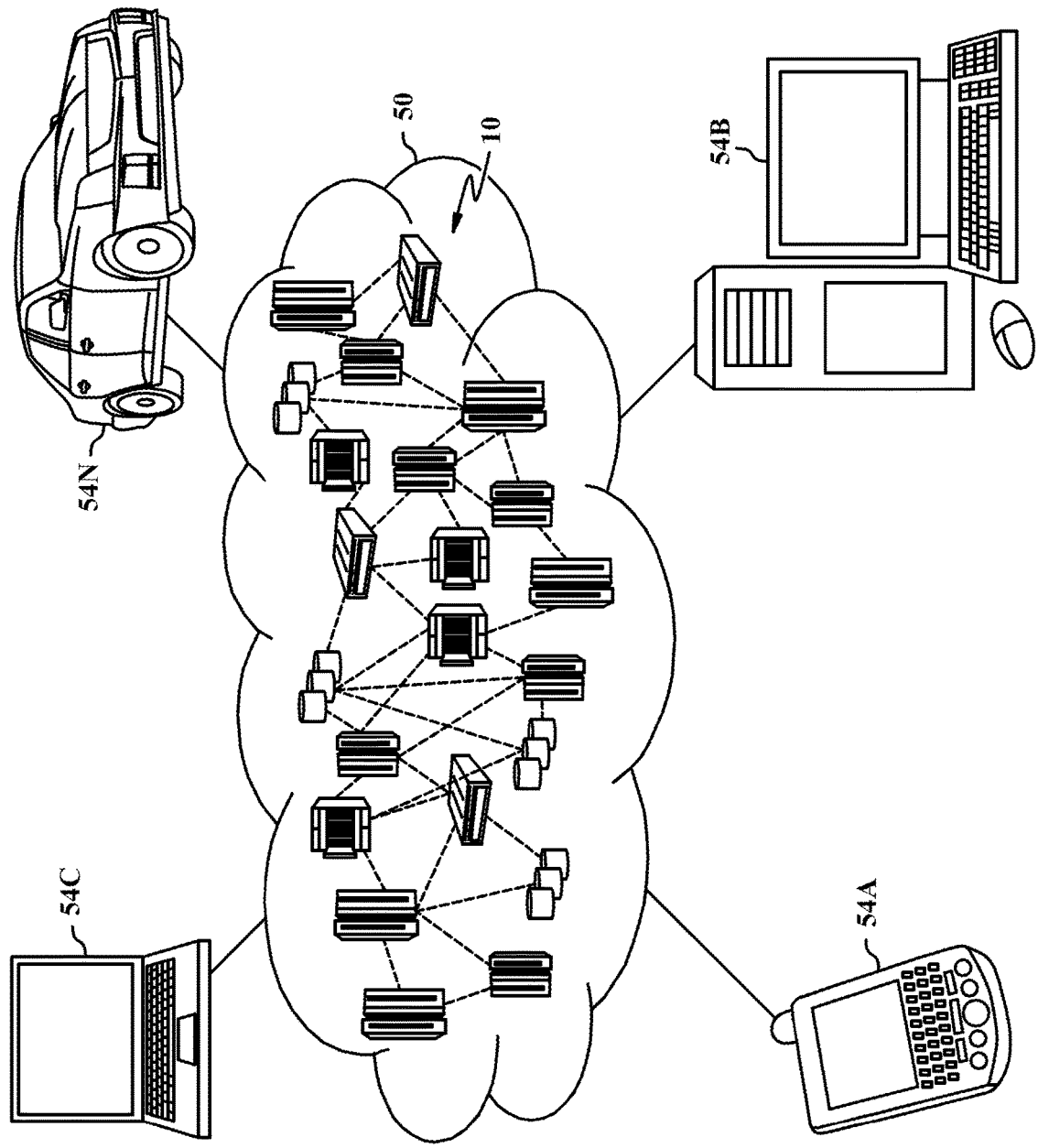
FIG. 11 depicts a cloud computing environment, in accordance with embodiments of the present disclosure.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
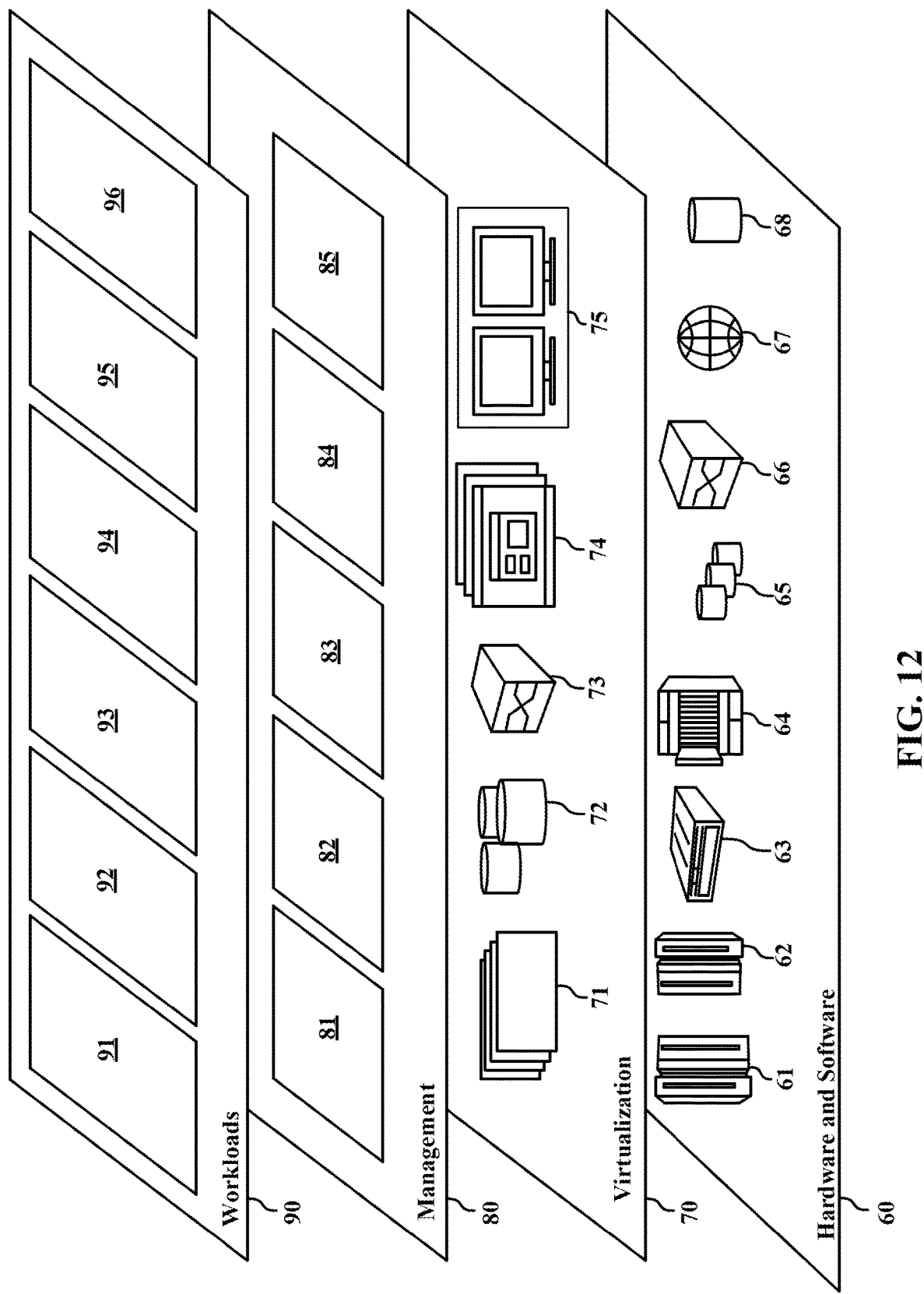
FIG. 12 depicts abstraction model layers, in accordance with embodiments of the present disclosure.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database encryption 96. The database encryption 96 may include instructions for performing various functions disclosed herein, such as allowing tenants in a multitenant cloud to encrypt transaction log data using user-defined encryption.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications, alterations, and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s). Additionally, it is intended that the following claim(s) be interpreted as covering all such alterations and modifications as fall within the true spirit and scope of the invention.

What is claimed is:

1. A method comprising:
    receiving a request to secure data of a tenant in a multitenant database, wherein tenants of the multitenant database each have an individual symmetric encryption key for encrypting both a respective tenant's data and transaction log file entries;
    responsive to the request to secure the tenants data, obtaining the tenant's symmetric encryption key that is specific to the tenant for encrypting both the tenant's data stored in the multitenant database and encrypting transaction log file entries associated with the tenant's data stored in the multitenant database;
    encrypting the tenant's data using the tenant's symmetric encryption key;
    storing the encrypted data in the multitenant database;
    encrypting, using the tenant's symmetric encryption key, a set of transaction log entries of individual transactions executed in the multitenant database in association with the data of the tenant; and
    storing the encrypted set of transaction log entries in a log file.

2. The method of claim 1, wherein the request to secure the data of the tenant is received during an initial registration of the tenant.

3. The method of claim 1, wherein obtaining the tenant's symmetric encryption key comprises generating the symmetric encryption key by performing a Diffie-Hellman key exchange operation to generate the symmetric encryption key.

4. The method of claim 3, wherein the Diffie-Hellman key exchange operation is performed by an automated process of a cloud service and by the tenant.

5. The method of claim 1, further comprising storing the tenant's symmetric encryption key in a secure area of the multitenant database, wherein the secure area is not accessible by a database operator.

6. The method of claim 5, wherein the secure area includes the symmetric encryption keys for the tenants of the multitenant database, each of the tenants having data in the multitenant database.

7. A system comprising:
a memory; and
a processor communicatively coupled to the memory, wherein the processor is configured to perform operations comprising:
receiving a query against a multitenant database, wherein the query is associated with data for a first tenant of a plurality of tenants having data in the multitenant database, wherein the plurality of tenants each have an individual symmetric encryption key for encrypting both a respective tenant's data and log records;
responsive to receiving the query, identifying a first tenant's symmetric encryption key, where the first tenant's symmetric encryption key is specific to the first tenant for encrypting log records associated with the first tenant;
processing the query;
generating, based on the query, a first log record of the query executed in the multitenant database in association with the data of the first tenant;
encrypting the first log record of the query using the first tenant's symmetric encryption key; and
storing the first log record in a transaction log for the multitenant database.

8. The system of claim 7, wherein each log record in the transaction log is encrypted using a symmetric encryption key of a tenant associated with the log record.

9. The system of claim 7, wherein identifying the first tenant's symmetric encryption key comprises:
determining a tenant ID the first tenant; and
retrieving, from a secure area of the memory, the first tenant's symmetric encryption key using the tenant ID of the first tenant.

10. The system of claim 9, wherein the secure area is not accessible by a database operator.

11. The system of claim 9, wherein the secure area includes symmetric encryption keys for each of the plurality of tenants.

12. The system of claim 7, wherein the first log record includes the query and one or more other fields, and wherein encrypting the first log record includes encrypting at least the query.

13. A computer program product comprising a computer readable storage medium having program instructions embodied therewith, the program instructions executable by a computer to perform operations comprising:
receiving a request to secure data of a tenant in a multitenant database, wherein tenants of the multitenant database each have an individual symmetric encryption key for encrypting both a respective tenant's data and transaction log file entries;
responsive to the request to secure the data of the tenant, obtaining the tenant's symmetric encryption key that is specific to the tenant for encrypting both the tenant's data stored in the multitenant database and encrypting transaction log file entries associated with the tenant's data stored in the multitenant database;
encrypting the tenant's data using the tenant's symmetric encryption key;
storing the encrypted data in the multitenant database;
encrypting, using the tenant's symmetric encryption key, a set of transaction log entries of individual transactions executed in the multitenant database in association with the data of the tenant; and
storing the encrypted set of transaction log entries in a log file.

14. The computer program product of claim 13, wherein the request to secure the data of the tenant is received during an initial registration of the tenant.

15. The computer program product of claim 13, wherein obtaining the tenant's symmetric encryption key comprises generating the symmetric encryption key by performing a Diffie-Hellman key exchange operation to generate the symmetric encryption key.

16. The computer program product of claim 15, wherein the Diffie-Hellman key exchange operation is performed by an automated process of a cloud service and by the tenant.

17. The computer program product of claim 13, wherein the operations further comprises storing the tenant's symmetric encryption key in a secure area of the multitenant database, wherein the secure area is not accessible by a database operator.

18. The computer program product of claim 17, wherein the secure area includes the symmetric encryption keys for the tenants of the multitenant database, each of the tenants having data in the multitenant database.

* * * * *